United States Patent [19]
Tsuji et al.

[11] Patent Number: 5,351,141
[45] Date of Patent: Sep. 27, 1994

[54] VIDEO SIGNAL CORRECTION SYSTEM

[75] Inventors: Toshiaki Tsuji, Kobe; Atsuhisa Kageyama, Ibaraki, both of Japan

[73] Assignee: Matsushita Electric Industrial Co., Ltd., Kadoma, Japan

[21] Appl. No.: 1,529

[22] Filed: Jan. 6, 1993

[30] Foreign Application Priority Data

Jan. 9, 1992 [JP] Japan .................................. 4-001920

[51] Int. Cl.5 .............................................. H04N 9/78
[52] U.S. Cl. .................... 358/520; 348/645; 348/712
[58] Field of Search ............... 358/31, 39, 515, 520; 348/645, 647, 663, 712; H04N 9/78, 9/68

[56] References Cited

U.S. PATENT DOCUMENTS

| 4,430,665 | 2/1984 | Cochran . |
| 5,060,056 | 10/1991 | Miki et al. ............................. 358/31 |

FOREIGN PATENT DOCUMENTS

| 3629403 | 3/1988 | Fed. Rep. of Germany . |
| 3809303 | 10/1989 | Fed. Rep. of Germany . |
| 4017881 | 12/1991 | Fed. Rep. of Germany . |
| 2650143 | 1/1991 | France . |
| 57-118492 | 7/1982 | Japan . |
| 58-121881 | 7/1983 | Japan . |
| 58-156287 | 9/1983 | Japan . |
| 58-161482 | 9/1983 | Japan . |
| 63-67874 | 3/1988 | Japan . |
| 01319386 | 12/1989 | Japan . |
| 02288583 | 11/1990 | Japan . |

Primary Examiner—Edward L. Coles, Sr.
Assistant Examiner—Kim Yen Vu
Attorney, Agent, or Firm—Spencer, Frank & Schneider

[57] ABSTRACT

A novel video signal correction system is disclosed, in which an average picture level detection circuit detects the average picture level (APL) of a luminance signal, and a coefficient calculation circuit calculates the amount of correction by the APL circuit. An adder adds an APL-corrected signal to a corrected luminance signal. A limiter circuit, on the other hand, limits the lower limit level of an input luminance signal. A divider circuit divides an output signal of the adder by an output signal of the limiter circuit, and the result is used to correct an input color signal. The color signal is thus capable of being corrected in accordance with the APL while at the same time preventing excessive correction of the color signal with a low brightness input.

6 Claims, 7 Drawing Sheets

VIDEO SIGNAL CORRECTION SYSTEM

BACKGROUND OF THE INVENTION

The present invention relates to a video signal correction system for correcting the saturation of a color signal to an optimum level in accordance with the amount of correction of the luminance signal in the process of tone correction (black level correction, gamma correction, etc.) of the video luminance signal for such appliances as television receivers, video tape recorders, video cameras and video discs.

With the increase in size and improvement in quality of the color television receiver in recent years, the video signal correction system has been used for enlarging the dynamic range of the image on the cathode ray tube (hereinafter called "CRT") by tone correction of the video luminance signal through a nonlinear amplifier in order to produce a clearer image.

A conventional video signal correction system will be explained. FIG. 6 is a block diagram showing a conventional video signal correction system. In FIG. 6, reference numeral 1 designates a luminance signal correction circuit for producing a corrected luminance signal by correcting the tone of the luminance signal input. This luminance signal correction circuit includes, for example, a black level correction circuit or a gamma correction circuit. Numeral 2 designates a contrast-brightness control circuit for altering the direct-current (hereinafter called "DC") bias level and contrast of the corrected luminance signal, numeral 3 a matrix circuit for producting a color signal from the luminance signal and a color difference signal, and numeral 4 a CRT. Numeral 5 designates a color demodulation circuit for demodulating the color carrier signal and producing the color difference signal, numeral 9 an adder for adding the contrast control voltage and the color control voltage to each other, numeral 6 a delay circuit for matching the time differences of the corrected luminance signal inputted to a divider circuit 7 and the delay luminance signal outputted from the delay circuit 6, numeral 7 a divider circuit for calculating the amount of correction of the luminance signal by dividing the corrected luminance signal by the delayed luminance signal and producing a color amplitude correction signal, and numeral 8 a multiplier circuit for subjecting the amplitude of the input color carrier signal to gain control by the color amplitude correction signal and producing a corrected color carrier signal. The circuits other than the CRT 4 may be configured of either analog or digital circuits or a combination thereof.

The operation of the video signal correction circuit configured as described above will be explained below. FIG. 7 shows waveforms produced at various parts of the circuit.

First, a luminance signal a inputted to the circuit is applied to the luminance signal correction circuit 1 and the tone of the luminance signal is corrected (as black level correction, gamma correction, etc., as an example) to produce a corrected luminance signal b. Let the level of the luminance signal a be Ey. From the specification of the NTSC system, equation (1) is given by:

$$Ey = 0.3Er + 0.59Eg + 0.11Eb \quad (1)$$

where Er is the voltage of the color signal R (red), Eg the voltage of the color signal G (green), and Eb the voltage of the color signal B (blue).

Assuming that the amount of brightness correction at a point on the image is A, the corrected luminance signal b is given as $A \times Ey$. This corrected luminance signal b is applied to the brightness control circuit 2, and after the amplitude and the DC bias level thereof are adjusted by the contrast control voltage g and the brightness control voltage h, an output luminance signal c is produced. In other words, assuming that the amount of gain correction by contrast control is C, the output luminance signal c is given as $A \times C \times Ey$.

The luminance signal a is delayed by the delay circuit 6 so as to be inputted to the divider circuit 7 at time as the corrected luminance signal b. The signal thus delayed is produced as the delayed luminance signal 1 and is applied to the divider circuit 7.

The divider circuit 7 divides the corrected luminance signal b by the delayed luminance signal 1 to detect the amount of correction of the luminance signal. Assuming that the amplitude of the delayed luminance signal 1 is equal to that of the luminance signal a, the amount A of correction of the luminance signal is expressed by the following equation (2):

$$A \times Ey/Ey = A \quad (2)$$

Although $\alpha \times A + \beta$ is the actual result due to an operational error occurring in the divider circuit, there will be no problem if $\alpha \approx 1$ and $\beta << A$.

This result is applied to the multiplier circuit 8 as a color amplitude correction signal m. The color carrier signal d is adjusted to an amplitude corresponding to the color amplitude correction signal m at the multiplier circuit 8. According to the NTSC system, the following equation (3) is given when En is the input color carrier signal:

$$En = (Er - Ey)/1.14 \times \cos(2 \times \pi \times fs \times t) + (Eb - Ey)/2.03 \times \sin(2 \times \pi \times fs \times t) \quad (3)$$

Thus the corrected color carrier signal n is given as $A \times En$, i.e., by the following equation (4):

$$A \times En = A \times (Er - Ey)/1.14 \times \cos(2 \times \pi \times fs \times t) + A \times (Eb - Ey)/2.03 \times \sin(2 \times \pi \times fs \times t) \quad (4)$$

The corrected color carrier signal n is applied to the color demodulation circuit 5 and is subjected to the tint control in accordance with the tint control voltage j and the color control in accordance with the color control voltage k as well as the color demodulation, after which the signal is produced as a color difference signal e. More specifically, the color difference signal e is the result of detection of equation (4), and takes the form of the corrected color carrier signal n multiplied by the amount of contrast correction C.

R−Y component: $A \times C \times (Er - Ey)$

B−Y component: $A \times C \times (Eb - Ey)$

G−Y component: $A \times C \times (Eg - Ey)$ \quad (5)

In these formulae, the calculated color control voltage k is obtained by operation of the adder 9 where the contrast control voltage g is added to the color control voltage i. In other words, the color control is effected in an operatively interlocked relation with the contrast control.

The color difference signals and the output luminance signal described above are all applied to the matrix circuit 3 for calculation. As a result, the color signal f shown in equation (6) is obtained.

$$R \text{ component: } A \times C \times Ey + A \times C \times (Er - Ey)$$
$$= A \times C \times Er$$

$$C \text{ component: } A \times C \times Ey + A \times C \times (Eg - Ey)$$
$$= A \times C \times Eg$$

$$B \text{ component: } A \times C \times Ey + A \times C \times (Eb - Ey)$$
$$= A \times C \times Eb \qquad (6)$$

The CRT 4 is driven by each voltage of the color signal f thus obtained thereby to display an image. (See JP-A-01344439, for instance).

In the conventional configuration mentioned above, however, the luminance signal a is applied in its direct form to the divider circuit 7 which divides the corrected luminance signal b by the delayed luminance signal 1. In the case where the level of the luminance signal a is near to the black level, i.e., zero, therefore, the quotient assumes a substantially infinite value, with the result that the correction of the color signal amplitude (saturation) becomes excessive.

Further, since the color signal is corrected regardless of the average picture level (hereinafter called "APL"), noise becomes conspicuous when a dark (low-APL) image is inputted.

SUMMARY OF THE INVENTION

An object of the present invention is to solve the above-mentioned problem and to provide a video signal correction system for preventing excessive correction of the color signal by preventing a signal below a specified value from being applied to the divider circuit 7 when the input luminance signal a is near zero. That is, the delayed luminance signal, which is the denominator of the color amplitude correction signal m, is not applied to the divider circuit 7 if it is below a given value.

Another object of the present invention is to provide a video signal correction system for reducing the color noise against an image of low APL (dark image) by controlling the correction of the color signal in accordance with the APL and the amount of correction of the luminance signal.

In order to achieve these objects, according to one aspect of the present invention, there is provided a video signal correction system comprising an APL detection circuit, a coefficient calculation circuit, an adder, a limiter circuit, a divider circuit, a multiplier circuit and a coefficient control circuit.

According to another aspect of the present invention, there is provided a video signal correction system comprising an APL detection circuit, a coefficient calculation circuit, first and second adders, a divider circuit and a multiplier circuit.

According to still another aspect of the present invention, there is provided a video signal correction system comprising an APL detection circuit, a coefficient calculation circuit, a limiter circuit, first and second divider circuits, an adder, a multiplier circuit and a coefficient control circuit.

According to a further aspect of the present invention, there is provided a video signal correction system comprising an APL detection circuit, a coefficient calculation circuit, first and second adders, first and second divider circuits and a multiplier circuit.

The above-mentioned configuration makes possible an operation in which a luminance signal functioning as the denominator of a ratio generated by a divider circuit is limited by a limiter circuit in such a manner that the lower limit of the signal is not lower than a predetermined level or a predetermined constant is added to all the input luminance signals in order to prevent the output signal of the divider circuit from increasing to an infinitely large value, with the result that excessive correction of the color signal is prevented thereby attaining optimum video signal correction.

The above-mentioned configuration also makes it possible to detect the APL and to correct the color signal by calculating the amount of correction commensurate with the APL of the input video signal and the amount of correction of the luminance signal, thereby optimally correcting the video signal in accordance with the APL.

DESCRIPTION OF THE PREFERRED EMBODIMENTS

Figure 1:
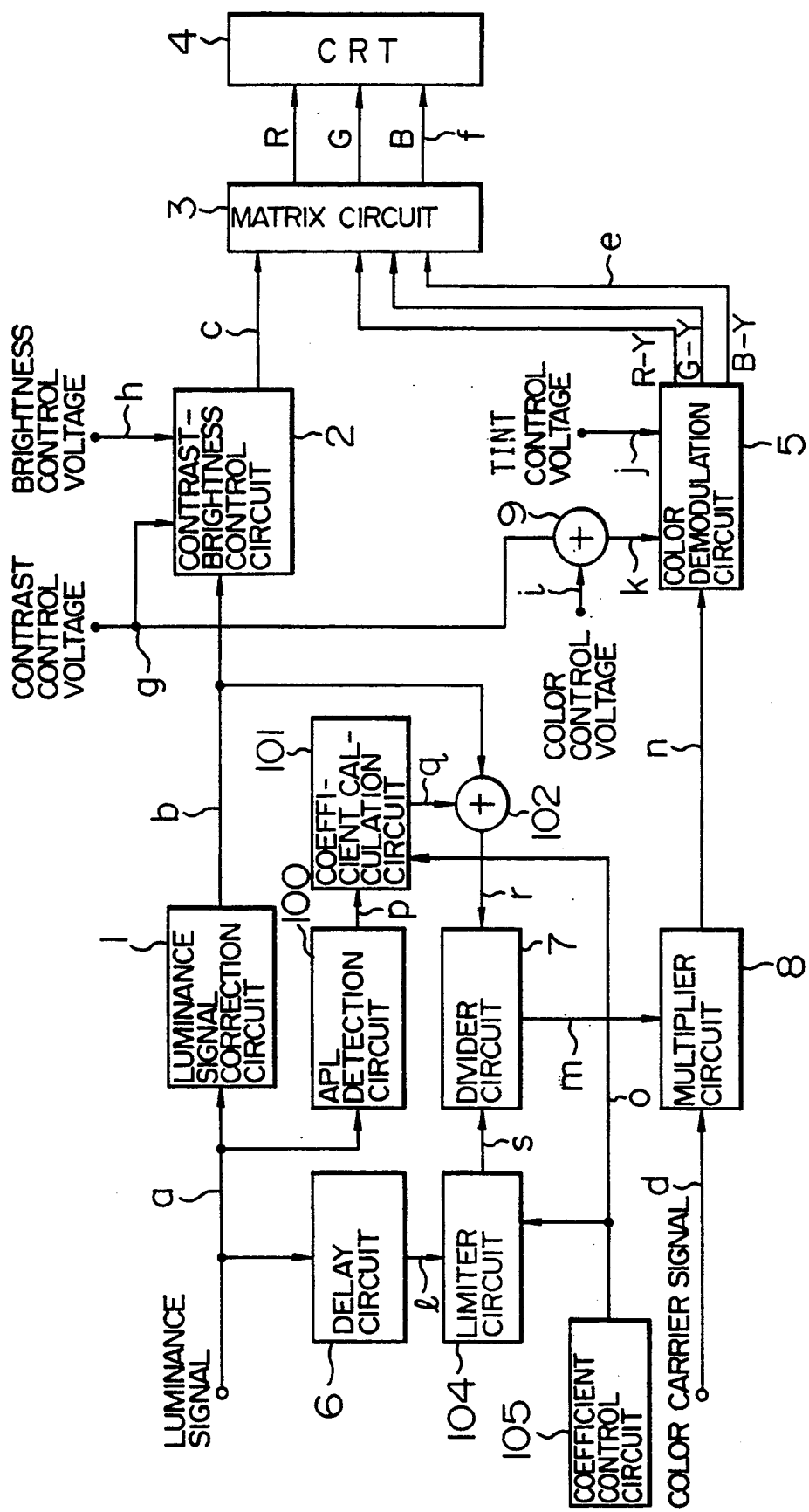
FIG. 1 is a block diagram showing a tone correction system according to a first embodiment of the present invention.
Figure 6:
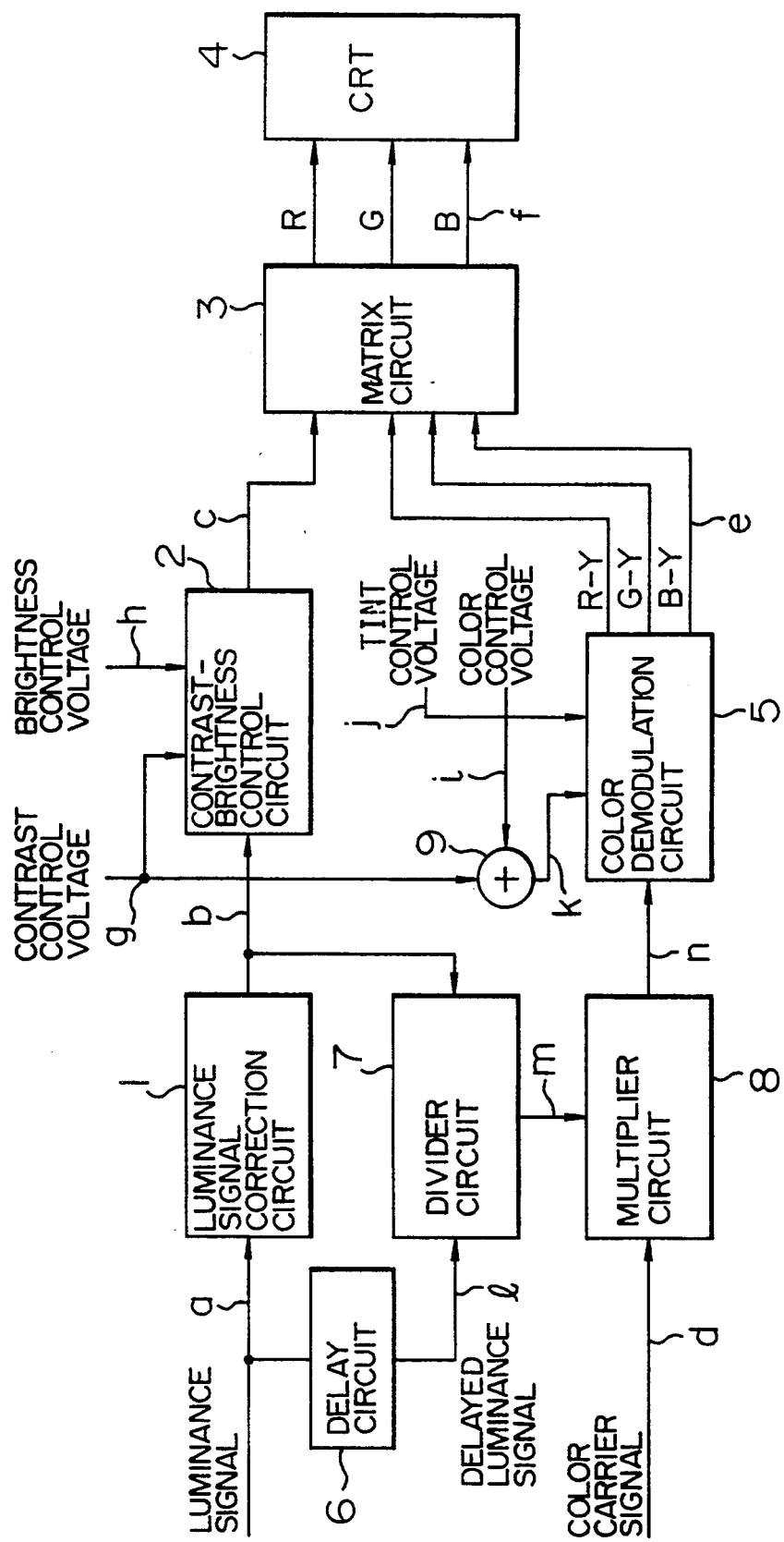
FIG. 6 is a block diagram showing a conventional tone correction system.
Figure 7:
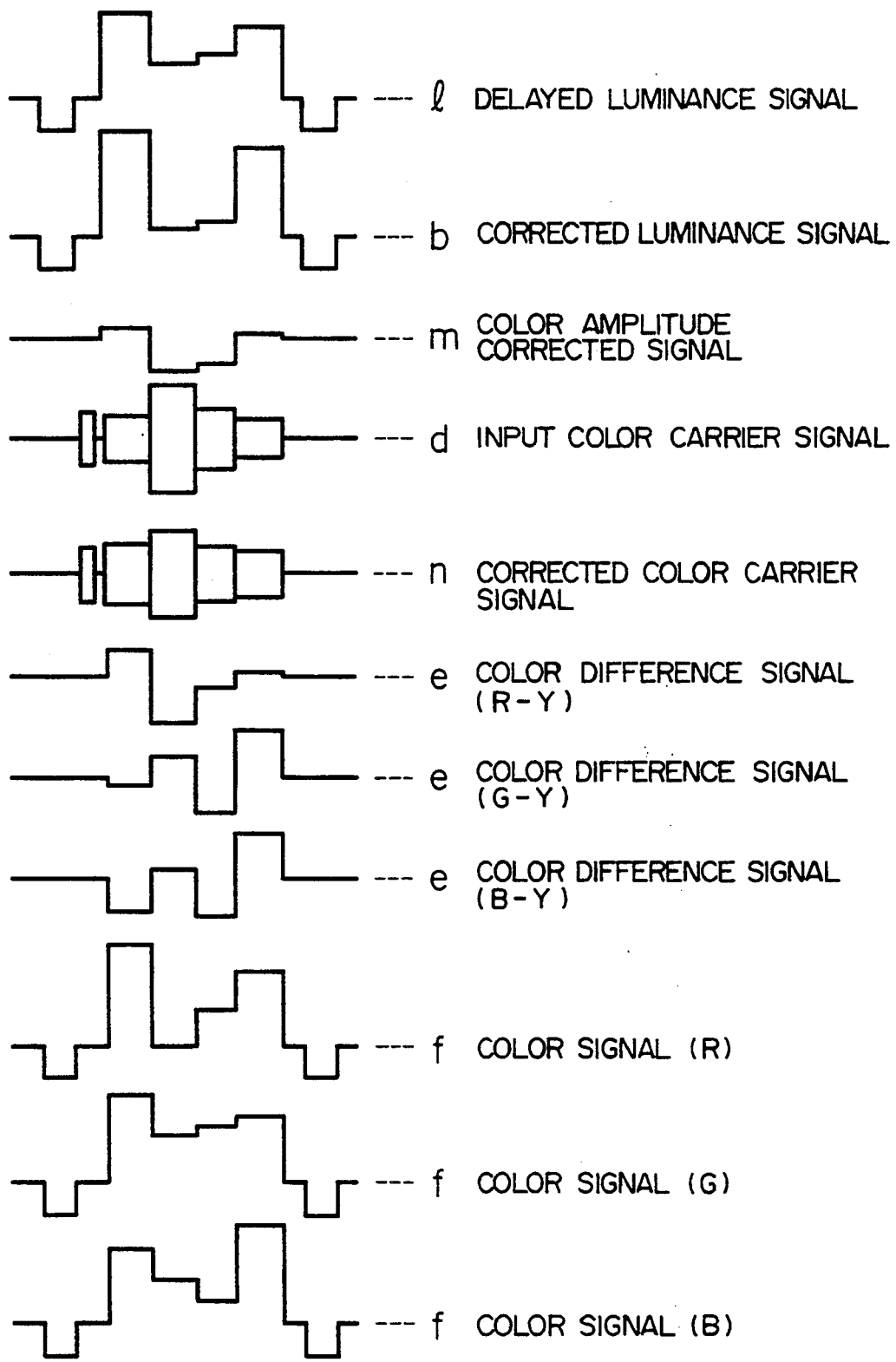
FIG. 7 is a diagram showing waveforms for explaining the operation of a conventional tone correction system.

The first embodiment of the present invention will be explained with reference to the accompanying drawing. In FIG. 1, reference numeral 1 designates a luminance signal correction circuit, numeral 2 a contrast-brightness control circuit, numeral 3 a matrix circuit, numeral 4 a CRT, numeral 5 a color demodulation circuit, numeral 9 an adder, numeral 6 a delay circuit, numeral 7 a divider circuit, and numeral 8 a multiplier circuit. This configuration is the same as that shown in FIG. 6. Numeral 100 designates an APL detection circuit for detecting the average picture level of the input luminance signal. Numeral 101 designates a coefficient calculation circuit for determining an APL-corrected signal by calculation from the APL detected at the APL detection circuit. Numeral 102 designates an adder for adding a corrected luminance signal to an APL-corrected signal. Numeral 104 designates a limiter circuit for limiting the low limit of the level of a delayed luminance signal. Numeral 105 designates a coefficient control circuit for controlling the operation of the coefficient calculation circuit 101 and the limiter circuit 104. Each of the circuits 100 to 105 may be configured of either an analog or a digital circuit or a combination thereof.

The operation of a video signal correction system configured as described above will be explained. First, the APL detection circuit 100 detects and produces an average picture level p of the luminance signal a. The coefficient calculation circuit 101 adds or subtracts a predetermind value to or from the APL signal p, and by making such calculations as to multiply the result of addition or subtraction by a predetermined constant, produces an APL-corrected signal q.

The luminance signal correction circuit 1 produces a corrected luminance signal b as in the conventional system. The adder 102 adds the corrected luminance signal b to the APL-corrected signal q and produces a corrected sum signal r.

The output signal 1 of the delay circuit 6, on the other hand, is limited in the bottom level thereof by the limiter circuit 104 so as not to be reduced below a predetermined level, and is produced as a limited delayed luminance signal s, as shown by the dashed line in FIG. 5. The divider circuit 7 divides the corrected signal r by the limited delayed luminance signal s, and applies the resulting quotient to the multiplier circuit 8 as a color amplitude corrected signal m.

The multiplier circuit 8 corrects the input color carrier signal d in accordance with the color amplitude corrected signal m.

The coefficient control circuit 105 controls the low limit of the limiter circuit 104 and the coefficient value generated by the coefficient calculation circuit 101 in interlocked relationship with each other.

As described above, according to the present embodiment comprising the APL detection circuit 100, the coefficient calculation circuit 101, the adder 102, the limiter circuit 104 and the coefficient control circuit 105, the color signal is corrected according to the APL thus preventing excessive correction of the color signal with the input signal at a low brightness level, thus realizing a comparatively small circuit.

The second embodiment of the present invention will be explained with reference to the accompanying drawing.

Figure 2:
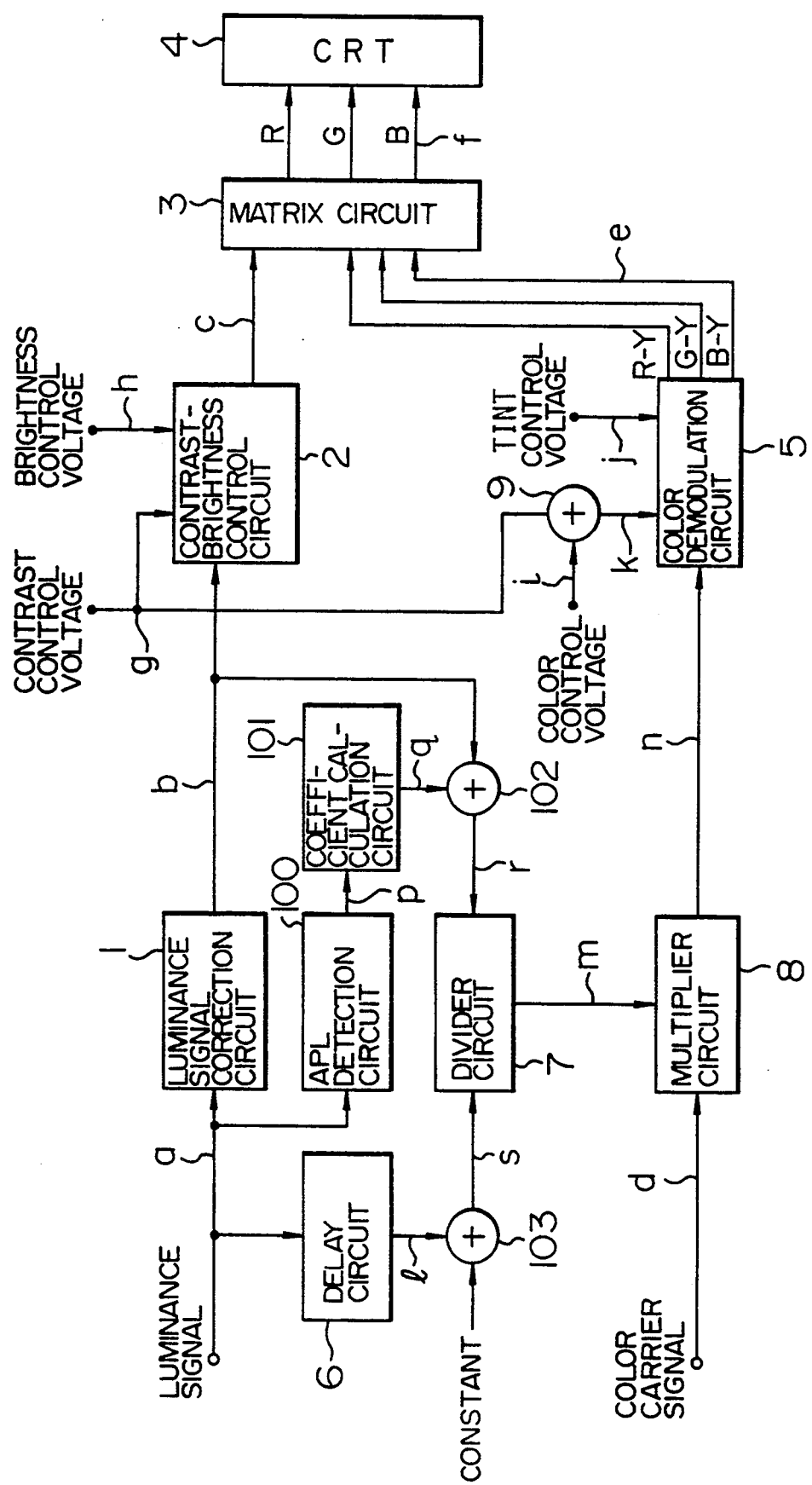
FIG. 2 is a block diagram showing a tone correction system according to a second embodiment of the present invention.

In FIG. 2, numeral 1 designates a luminance signal correction circuit, numeral 2 a contrast-brightness control circuit, numeral 3 a matrix circuit, numeral 4 a CRT, numeral 5 a color demodulation circuit, numeral 9 an adder, numeral 6 a delay circuit, numeral 7 a divider circuit, numeral 8 a multiplier circuit, numeral 100 an APL detection circuit, numeral 101 a coefficient calculation circuit, and numeral 102 an adder. This embodiment has substantially the same configuration as that of FIG. 1.

The configuration of this embodiment, however, is different from that of FIG. 1 in that in this configuration, a predetermined value is added to the delayed luminance signal at a second adder 103.

The operation of a video signal correction system configured as mentioned above will be explained. First, the luminance signal correction circuit 1 produces a corrected luminance signal b. The APL detection circuit 100 detects the average picture level p of the luminance signal a, and on the basis of this signal, calculates the APL-corrected signal q at the coefficient calculation circuit 101. Then the first adder 102 adds the corrected luminance signal b and the APL-corrected signal q to each other and produces a corrected signal r. This operation is identical to that of the first embodiment.

Figure 5:
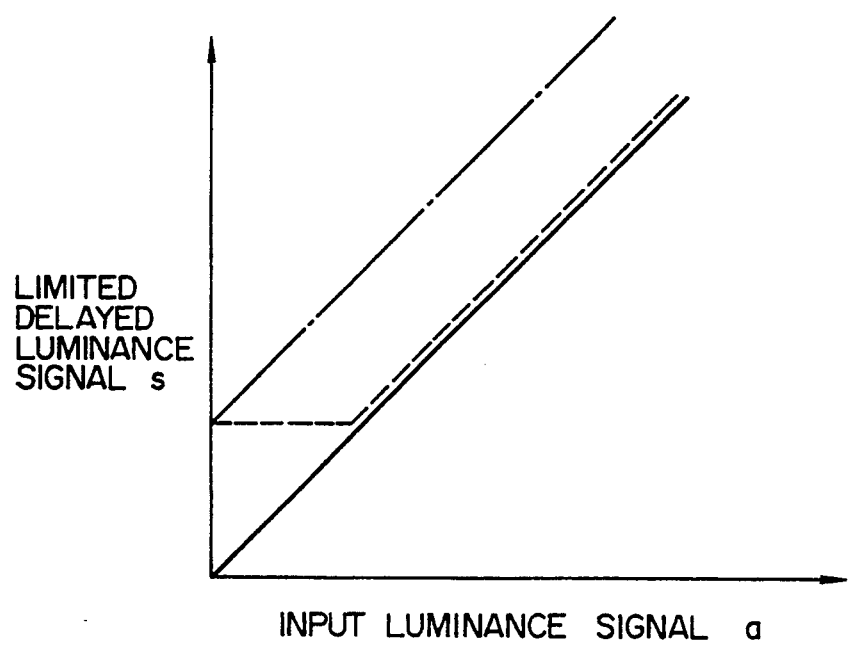
FIG. 5 is a graph showing a comparison between the first and second embodiments.

The output signal of the delay circuit 6, on the other hand, has a predetermined constant added thereto at the second adder 103, which signal is produced as a limited delayed luminance signal s as shown by the dash-dot line of FIG. 5.

The divider circuit 7 divides the corrected signal r by the limited delayed luminance signal s, and applies the resuling quotient to the multiplier circuit 8 as a color amplitude corrected signal. The multiplier circuit 8 corrects the input color carrier signal d in accordance with the color amplitude corrected signal m.

As explained above, according to the present embodiment comprising the APL detection circuit 100, the coefficient calculation circuit 101, the first adder 102 and the second adder 103, the color signal is corrected in accordance with the APL in linear fashion against the input brightness level. A comparatively small circuit configuration is thus realized.

The third embodiment of the present invention will be explained below with reference to the accompanying drawing.

Figure 3:
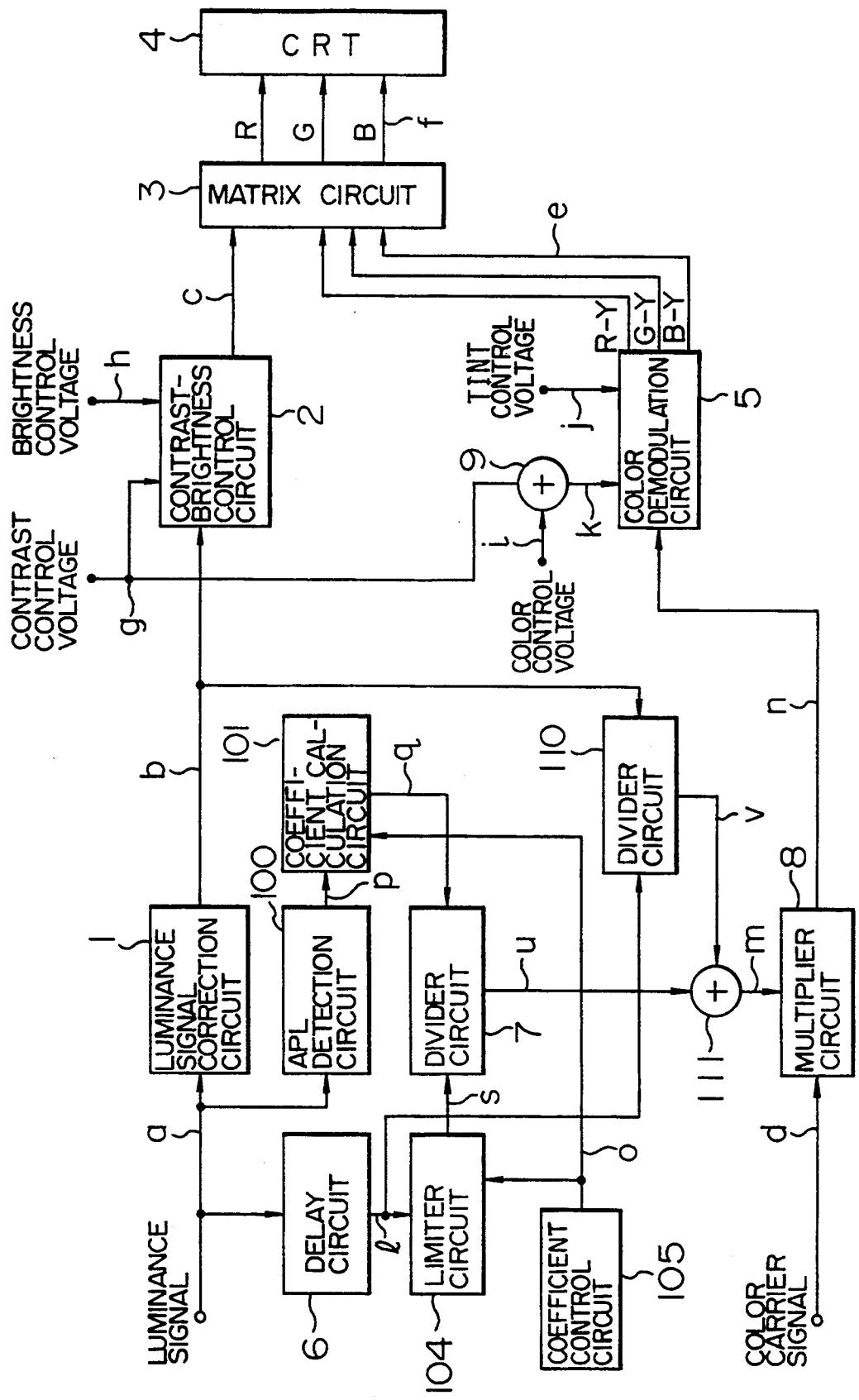
FIG. 3 is a block diagram showing a tone correction system according to a third embodiment of the present invention.

In FIG. 3, numeral 1 designates a luminance signal correction circuit, numeral 2 a contrast-brightness control circuit, numeral 3 a matrix circuit, numeral 4 a CRT, numeral 5 a color demodulation circuit, numeral 9 an adder, numeral 6 a delay circuit, numeral 8 a multiplier circuit, numeral 100 an APL detection circuit, numeral 101 a coefficient calculation circuit, numeral 104 a limiter circuit and numeral 105 a coefficient control circuit. The configuration of this embodiment is similar to that of FIG. 1.

The configuration of the present embodiment is different from that of FIG. 1 in that in the present embodiment the first divider circuit 7 subjects the APL-corrected signal and the limited delayed luminance signal to the dividing operation, a second divider circuit 110 subjects the delayed luminance signal and the corrected luminance signal to the dividing operation, and the adder 111 adds the output signals of the first and second dividers to each other.

The operation of the video signal correction system configured as explained above will be explained.

First, the luminance signal correction circuit 1 produces the corrected luminance signal b. The APL detection circuit 100 detects the average picture level p of the luminance signal a, and on the basis of this signal, the coefficient calculation circuit 101 calculates the APL-corrected signal q. Further, the low limit of the delayed luminance signal 1 is limited by the limiter circuit 104 thereby to produce the limited delayed luminance signal s.

The coefficient control circuit 105 controls the low limit value of the limiter circuit 104 and the value of the coefficient calculation circuit 101 in interlocked relationship with each other. The above-mentioned operation is similar to that of the first embodiment.

The first divider circuit 7 divides the APL-corrected signal q by the limited delayed luminance signal s, and applies the resulting quotient as a first corrected signal u. The second divider circuit 110, on the other hand, divides the corrected luminance signal b by the delayed luminance signal 1 and produces the result as a second corrected signal v. The adder 111 adds the first and second corrected signals u and v to each other and produces a color amplitude corrected signal m.

The multiplier circuit 8 corrects the color carrier signal d in accordance with the color amplitude corrected signal m.

As explained above, according to the present embodiment comprising the APL detection circuit 100, the coefficient calculation circuit 101, the limiter circuit 104, the coefficient control circuit 105, the second divider circuit 110 and the adder 111, the color signal is corrected in accordance with the APL. Further, the relation between the amount of correction of the luminance signal and that of the color signal is maintained at a constant ratio.

Now, a fourth embodiment of the present invention will be explained with reference to the accompanying drawing.

Figure 4:
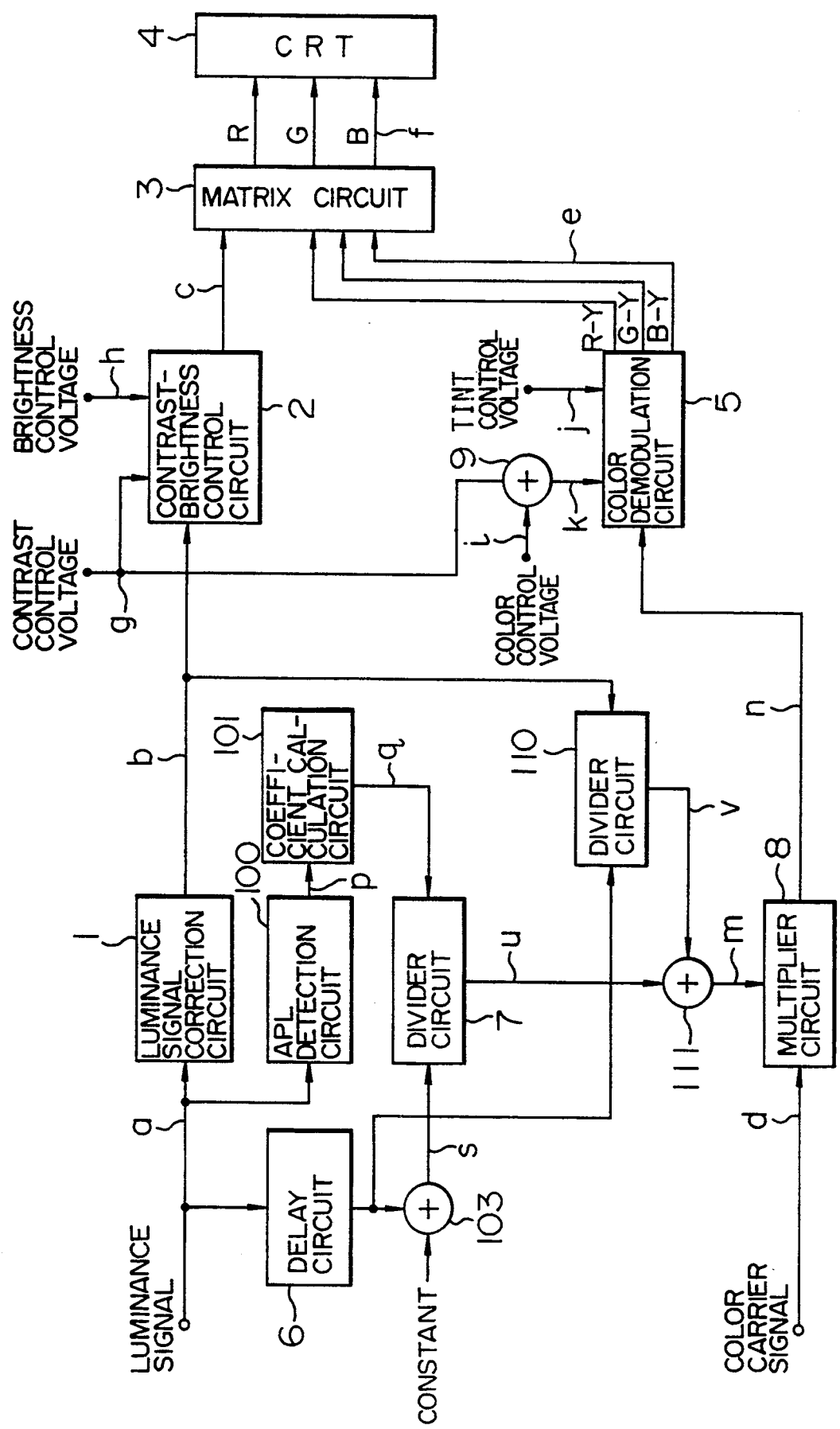
FIG. 4 is a block diagram showing a tone correction system according to a fourth embodiment of the present invention.

In FIG. 4, numeral 1 designates the luminance signal correction circuit, numeral 2 the contrast-brightness control circuit, numeral 3 the matrix circuit, numeral 4 the CRT, numeral 5 the color demodulation circuit, numeral 9 the adder, numeral 6 the delay circuit, numeral 7 the first divider circuit, numeral 8 the multiplier circuit, numeral 100 the APL detection circuit, numeral 101 the coefficient calculation circuit, numeral 110 the second divider circuit and numeral 111 the first adder. The configuration of this embodiment is similar to that of the system shown in FIG. 3.

The configuration of the present embodiment is different from that shown in FIG. 3 in that in the present embodiment a second adder 103 adds a predetermined value to the delayed luminance signal.

The operation of a video signal correction system configured as above will be explained.

First, the luminance signal correction circuit 1 produces a corrected luminance signal b. Also, the APL detection circuit 100 detects the average picture level p of the input luminance signal a, and on the basis of the particular signal, the coefficient calculation circuit 101 calculates the APL-corrected signal q. Further, the second adder 103 adds a predetermined constant to the delayed luminance signal 1 and produces a limited delayed luminance signal s. This operation is identical to that of the second embodiment.

Now, the first divider circuit 7 divides the APL-corrected signal q by the limited delayed luminance signal s, and produces the result as a first corrected signal u. On the other hand, the second divider circuit 110 divides the corrected luminance signal b by the delayed luminance signal 1, and produces the result as a second corrected signal v. The adder 111 adds the first and second corrected signals u and v to each other and produces a color amplitude corrected signal m.

The multiplier circuit 8 corrects the color carrier signal d in accordance with the color amplitude corrected signal m.

As described above, according to the present embodiment comprising the APL detection circuit 100, the coefficient calculation circuit 101, the second adder 103, the second divider circuit 110 and a third adder 111, the color signal is corrected by APL in linear fashion against the input picture brightness level. Further, the relation between the amount of correction of the luminance signal and that of the color signal is maintained at a predetermined ratio for all brightness levels.

As explained above, according to the present embodiment comprising the APL detection circuit, the coefficient calculation circuit, the adder, the limiter circuit, the divider circuit, the multiplier circuit and the coefficient control circuit, the color signal is corrected in accordance with the APL. Further, a tone correction system is realized in which excessive correction of the color signal with an input signal at a low brightness level is prevented.

Also, the present embodiment configured of the APL detection circuit, the coefficient calculation circuit, the first and second adders, the divider circuit and the multiplier circuit realizes a tone correction system in which the color signal is capable of being corrected in accordance with the APL, and that in linear fashion against the input luminance signal.

Further, according to the present invention, the configuration of the APL detection circuit, the coefficient calculation circuit, the limiter circuit, the first and second divider circuits, the adder, the multiplier circuit and the coefficient control circuit realizes a tone correction system in which the color signal is corrected in accordance with the APL, and the excessive correction of the color signal is prevented with an input signal at a low brightness level. Further, the color signal is capable of being corrected at the same proportion as the luminance signal.

Furthermore, according to the present invention, the configuration of the APL detection circuit, the coefficient calculation circuit, the first and second adders, the second divider circuit and the multiplier circuit realizes a tone correction circuit in which the color is corrected in accordance with the APL, and that in linear fashion with respect to the input luminance signal. Further, the color signal is capable of being corrected in the same proportion as the luminance signal.

We claim:

1. A video signal correction system for correcting the saturation of a color signal comprising:
   a luminance signal correction circuit for correcting the tone of an input luminance signal;
   an average picture level detection circuit for detecting the average picture level of the luminance signal;
   a coefficient calculation circuit for effecting corrective calculations on the basis of an output signal of the average picture level detection circuit;
   an adder for adding an output signal of the luminance signal correction circuit and an output signal of the coefficient calculation circuit to each other;
   a delay circuit for delaying the luminance signal;
   a limiter circuit for limiting the low limit level of an output signal of the delay circuit;
   a divider circuit for dividing an output signal of the adder by an output signal of the limiter circuit;
   a multiplier circuit for controlling the amplitude of an input color carrier signal by an output signal of the divider circuit; and
   a coefficient control circuit for controlling the coefficient calculation circuit and the limiter circuit.

2. A video signal correction system for correcting the saturation of a color signal comprising:
   a luminance signal correction circuit for correcting the tone of an input luminance signal;
   an average picture level detection circuit for detecting the average picture level of the luminance signal;
   a coefficient calculation circuit for effecting corrective calculations on the basis of an output signal of the average picture level detection circuit;
   a first adder for adding an output signal of the luminance signal correction circuit and an output of the coefficient calculation circuit to each other;
   a delay circuit for delaying the luminance signal;
   a second adder for adding an output signal of the delay circuit and a constant to each other;

a divider circuit for dividing an output signal of the first adder by an output signal of the second adder; and a multiplier circuit for controlling the amplitude of the input color carrier signal by an output signal of the divider circuit.

3. A video signal correction system for correcting the saturation of a color signal comprising:

a luminance signal correction circuit for receiving a luminance signal and producing a corrected luminance signal, said luminance signal correction circuit correcting the tone of said luminance signal;

an average picture level detection circuit for receiving said luminance signal and producing an average picture level signal at an output thereof;

a coefficient calculation circuit coupled to the output of said average picture level detection circuit, said coefficient calculation circuit producing a corrected average picture level signal;

a delay circuit for receiving said luminance signal and producing a delayed luminance signal at an output thereof;

luminance signal limiting means coupled to the output of said delay circuit, said luminance signal limiting means producing a limited delayed luminance signal having a value above a predetermined level;

an adder for receiving said corrected luminance signal and said corrected average picture level signal, said adder producing a corrected sum signal;

a divider circuit coupled to said adder and said luminance signal limiting means for dividing said corrected sum signal by said limited delayed luminance signal, a color amplitude corrected signal being produced at an output of said divider circuit; and a multiplier circuit for receiving an input color carrier signal and being coupled to the output of said divider circuit, said color amplitude corrected signal controlling the amplitude of the input color carrier signal.

4. A video signal correction system as defined by claim 3 wherein said luminance signal limiting means comprises a limiter circuit for maintaining said limited delayed luminance signal above the predetermined level.

5. A video signal correction system as defined by claim 3 wherein said luminance signal limiting means comprises a second adder, said second adder adding a signal having a predetermined constant value to said delayed luminance signal for maintaining said limited delayed luminance signal above the predetermined level.

6. A video signal correction system as defined by claim 4 which further comprises a coefficient control circuit coupled to said coefficient calculation circuit and said limiter circuit, said coefficient control circuit controlling a low limit of said limiter circuit and a coefficient value generated by said coefficient calculation circuit in interlocked relationship with each other.

* * * * *